(12) United States Patent
Pu et al.

(10) Patent No.: US 9,591,062 B2
(45) Date of Patent: Mar. 7, 2017

(54) SYSTEMS AND METHODS FOR DATA EXCHANGE IN VOICE COMMUNICATION

(71) Applicant: Tencent Technology (Shenzhen) Company Limited, Shenzhen (CN)

(72) Inventors: Donglin Pu, Shenzhen (CN); Shu Peng, Shenzhen (CN); Wenxin Si, Shenzhen (CN); Zhenyu Yu, Shenzhen (CN); Xun Wang, Shenzhen (CN); Taijun Zeng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 256 days.

(21) Appl. No.: 14/190,558

(22) Filed: Feb. 26, 2014

(65) Prior Publication Data

US 2014/0344333 A1 Nov. 20, 2014

Related U.S. Application Data

(63) Continuation of application No. PCT/CN2013/087314, filed on Nov. 18, 2013.

(30) Foreign Application Priority Data

Apr. 15, 2013 (CN) .......................... 2013 1 0130188

(51) Int. Cl.
*G06F 15/16* (2006.01)
*H04L 29/08* (2006.01)
(Continued)

(52) U.S. Cl.
CPC .......... *H04L 67/10* (2013.01); *H04L 12/1822* (2013.01); *H04L 65/1089* (2013.01);
(Continued)

(58) Field of Classification Search
CPC ............... H04L 12/1822; H04L 67/146; H04L 65/1089; G06F 21/316; G06F 15/16
(Continued)

(56) References Cited

U.S. PATENT DOCUMENTS 5,293,450 A * 3/1994 Kane ................... G10L 19/0204
704/226
6,683,938 B1 * 1/2004 Henderson ............ H04M 3/487
379/101.01
(Continued)

FOREIGN PATENT DOCUMENTS

CN 101146097 A 3/2008
CN 102497423 A 6/2012
(Continued)

OTHER PUBLICATIONS

China Patent Office, Office Action issued Apr. 30, 2015, in Application No. 201310130188.7.
(Continued)

*Primary Examiner* — Tesfay Yohannes
(74) *Attorney, Agent, or Firm* — Jones Day

(57) ABSTRACT

Systems and methods are provided for data exchange in voice communication. For example, a first request message is sent to a server for playing background music in voice communication; an authorization granted by the server to play background music separately from the voice communication is received; and upon reception of a play instruction from a user, the background music is played and an identifier of the background music is sent to the server. The server broadcasts the background music to one or more clients based on at least information associated with the identifier of the background music.

17 Claims, 11 Drawing Sheets

(51) Int. Cl.
  *H04L 12/18* (2006.01)
  *H04N 21/2387* (2011.01)
  *H04N 21/4788* (2011.01)
  *H04N 21/81* (2011.01)
  *H04N 21/8352* (2011.01)
  *H04L 29/06* (2006.01)

(52) U.S. Cl.
  CPC ..... *H04N 21/2387* (2013.01); *H04N 21/4788* (2013.01); *H04N 21/8113* (2013.01); *H04N 21/8352* (2013.01)

(58) Field of Classification Search
  USPC .......................................... 709/203; 455/467
  See application file for complete search history.

(56) References Cited

U.S. PATENT DOCUMENTS

| | | | | |
|---|---|---|---|---|
| 9,223,950 | B2* | 12/2015 | Li | G06F 21/31 |
| 2003/0014262 | A1* | 1/2003 | Kim | A63F 13/06 |
| | | | | 704/278 |
| 2006/0211455 | A1* | 9/2006 | Choi | H04L 12/5895 |
| | | | | 455/567 |
| 2007/0247979 | A1* | 10/2007 | Brillon | G06Q 30/0603 |
| | | | | 369/30.06 |
| 2008/0293356 | A1* | 11/2008 | Kummernuss | H04W 4/02 |
| | | | | 455/3.04 |
| 2010/0110082 | A1* | 5/2010 | Myrick | G06T 13/80 |
| | | | | 345/473 |
| 2010/0323618 | A1 | 12/2010 | Pal | |
| 2012/0158531 | A1* | 6/2012 | Dion | G06Q 10/10 |
| | | | | 705/26.1 |
| 2013/0335509 | A1* | 12/2013 | Cafferata | G06Q 30/02 |
| | | | | 348/14.08 |
| 2014/0259130 | A1* | 9/2014 | Li | G06F 21/31 |
| | | | | 726/6 |

FOREIGN PATENT DOCUMENTS

| | | |
|---|---|---|
| CN | 102572729 A | 7/2012 |
| WO | WO 2012/079409 A1 | 6/2012 |

OTHER PUBLICATIONS

Patent Cooperation Treaty, International Search Report, PCT/CN2013/087314, Oct. 23, 2014.
Patent Cooperation Treaty, Written Opinion of the International Searching Authority, PCT/CN2013/087314, mailed Feb. 27, 2014.
Patent Cooperation Treaty, International Preliminary Report on Patentability, PCT/CN2013/087314, issued Oct. 20, 2015.

* cited by examiner

400

# SYSTEMS AND METHODS FOR DATA EXCHANGE IN VOICE COMMUNICATION

CROSS-REFERENCES TO RELATED APPLICATIONS

This application is a continuation of International Application No. PCT/CN2013/087314, with an international filing date of Nov. 18, 2013, now pending, which claims priority to Chinese Patent Application No. 201310130188.7, filed Apr. 15, 2013, both applications being incorporated by reference herein for all purposes.

BACKGROUND OF THE INVENTION

Certain embodiments of the present invention are directed to computer technology. More particularly, some embodiments of the invention provide systems and methods for communication technology. Merely by way of example, some embodiments of the invention have been applied to voice communication. But it would be recognized that the invention has a much broader range of applicability.

Current voice communication products, such as QT Voice and QQ Voice, enable multiple users to speak and listen simultaneously. In addition, the users can play background music on their respective clients during the voice communication.

But the above-noted conventional technology has some disadvantages. For example, voice data and music data are often bundled together for transmission. Thus, when the background music is played in voice communication, the voice and the music are often mixed up.

Hence it is highly desirable to improve the techniques for voice communication.

BRIEF SUMMARY OF THE INVENTION

According to one embodiment, a method provided for data exchange in voice communication. For example, a first request message is sent to a server for playing background music in voice communication; an authorization granted by the server to play background music separately from the voice communication is received; and upon reception of a play instruction from a user, the background music is played and an identifier of the background music is sent to the server. The server broadcasts the background music to one or more clients based on at least information associated with the identifier of the background music.

According to another embodiment, a method is provided for data exchange in voice communication. For example, a first request message for playing background music in voice communication is received from a first client; in response to a status-indication message indicating that a stage for playing background music is not used, the first client is granted an authorization to play the background music separately from the voice communication; an identifier of the background music being played on the first client is received from the client; and the background music is broadcasted to one or more second clients based on at least information associated with the identifier of the background music.

According to yet another embodiment, a client includes: a sending unit configured to send to a server a first request message for playing background music in voice communication, a receiving unit configured to receive an authorization granted by the server to play the background music separately from the voice communication and receive a play instruction from a user, and a playing unit configured to play the background music based on at least information associated with the play instruction received by the receiving unit. The sending unit is further configured to send to the server an identifier of the background music being played by the playing unit so that the server broadcasts the background music to one or more other clients based on at least information associated with the identifier of the background music.

According to yet another embodiment, a server includes: a receiving unit configured to receive from a first client a first request message for playing background music in voice communication, and an authorization unit configured to, in response to a status-indication message indicating that a stage for playing background music is not used, grant the first client an authorization to play the background music separately from the voice communication, where the receiving unit is further configured to receive from the first client an identifier of the background music being played on the first client. The server further includes a broadcasting unit configured to broadcast the background music to one or more second clients based on at least information associated with the identifier of the background music received by the receiving unit.

In one embodiment, a system for data exchange in voice communication includes a first client and a server. The first client includes: a first sending unit configured to send to the server a first request message for playing background music in voice communication, a first receiving unit configured to receive an authorization granted by the server to play the background music separately from the voice communication and receive a play instruction from a user, and a playing unit configured to play the background music based on at least information associated with the play instruction received by the first receiving unit. The first sending unit is further configured to send to the server an identifier of the background music being played by the playing unit. The server includes: a second receiving unit configured to receive from the first client the first request message for playing the background music in the voice communication, and an authorization unit configured to, in response to a status-indication message indicating that a stage for playing the background music is not used, grant the first client the authorization to play the background music separately from the voice communication, where the second receiving unit is further configured to receive from the first client the identifier of the background music being played on the first client. The server further includes a broadcasting unit configured to broadcast the background music to one or more second clients based on at least information associated with the identifier of the background music received by the second receiving unit.

In another embodiment, a non-transitory computer readable storage medium includes programming instructions for data exchange in voice communication. The programming instructions are configured to cause one or more data processors to execute certain operations. For example, a first request message is sent to a server for playing background music in voice communication; an authorization granted by the server to play background music separately from the voice communication is received; and upon reception of a play instruction from a user, the background music is played and an identifier of the background music is sent to the server. The server broadcasts the background music to one or more clients based on at least information associated with the identifier of the background music.

In yet another embodiment, a non-transitory computer readable storage medium includes programming instructions for data exchange in voice communication. The programming instructions are configured to cause one or more data processors to execute certain operations. For example, a first request message for playing background music in voice communication is received from a first client; in response to a status-indication message indicating that a stage for playing background music is not used, the first client is granted an authorization to play the background music separately from the voice communication; an identifier of the background music being played on the first client is received from the client; and the background music is broadcasted to one or more second clients based on at least information associated with the identifier of the background music.

For example, the systems and methods described herein are configured to transmit voice data and music data separately in voice communication to avoid the mixing of voice data and music data. In another example, the systems and methods described herein are configured to add reward-logic modules to the delivery layer so as to support parallel expansion.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
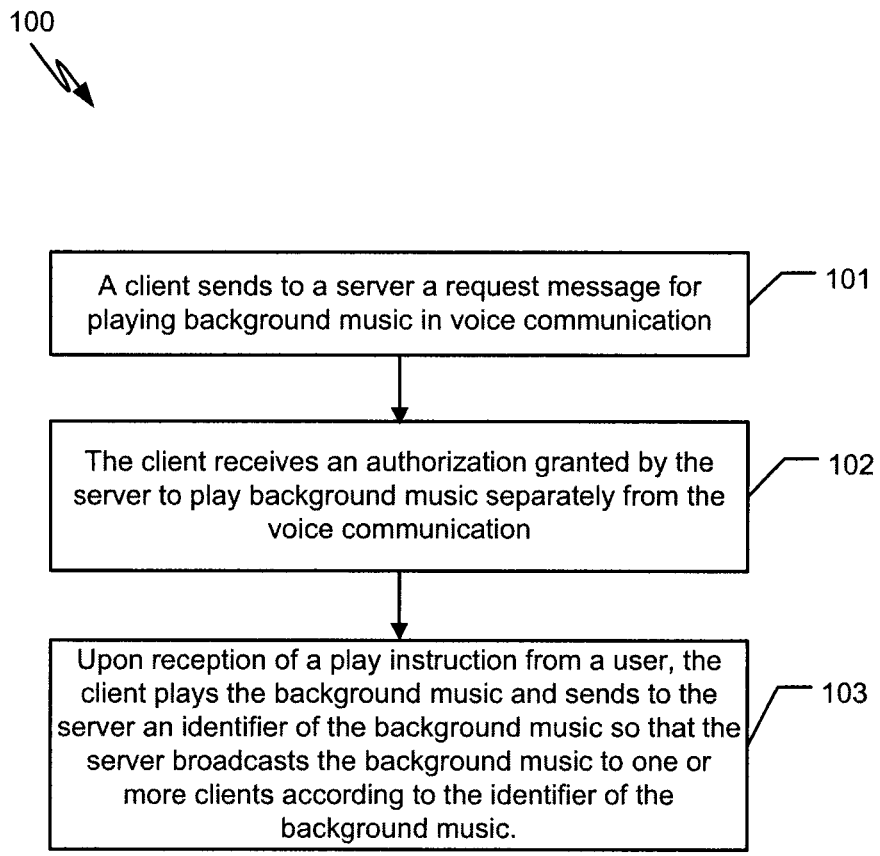
FIG. 1 is a simplified diagram showing a method for data exchange in voice communication according to one embodiment of the present invention.

FIG. 1 is a simplified diagram showing a method for data exchange in voice communication according to one embodiment of the present invention. This diagram is merely an example, which should not unduly limit the scope of the claims. One of ordinary skill in the art would recognize many variations, alternatives, and modifications. The method 100 includes at least the processes 101-103.

According to one embodiment, during the process 101, a client sends to a server a request message for playing background music in voice communication. For example, during a multi-user voice conversation via a voice communication software (e.g., QT Voice or QQ Voice), a request is sent to the server in order to allow everyone in a chat room to hear some background music. In another example, during the process 102, the client receives an authorization granted by the server to play the background music separately from the voice communication. As an example, upon confirmation of the server, the client that sends the back-ground-music request is authorized to play the background music in the chat room. In another example, if a plurality of clients submits requests for playing background music, the server sorts these clients so that these clients can play the background music in turn. As the voice conversation and the background music are transmitted in separate channels, any voice communication between a particular user and other users is not interfered with or interrupted by the background music, in some embodiments.

According to another embodiment, during the process 103, after receiving a play instruction from a user, the client plays the background music and sends to the server an identifier of the background music being played so that the server broadcasts the background music being played to other clients according to the identifier of the background music. For example, after obtaining the authorization to play the background music, the client can play the background music and send to the server the identifier of the background music being played upon receipt of a playing instruction input by the user. In this way, the server can broadcast the background music being played to other clients according to the identifier of the background music so that all other users in the chat room can hear the background music, in some embodiments.

According to yet another embodiment, the process 101 includes: sending to the server a status-request message associated with a stage for playing the background music. For example, the process 102 includes: receiving from the server a status-indication message associated with the stage for playing the background music, and in response to the status-indication message indicating that the stage for playing the background music is not used, occupying the stage for playing the background music based on at least information associated with a stage-occupation message from the user. As an example, the client requests from the server the status of the stage for playing the background music. In another example, when the server returns the status indicating the stage for playing background music is not used, the stage for playing background music may be occupied after the user inputs an indication message to occupy or enter the stage.

In one embodiment, the process for occupying the stage for playing the background music based on at least information associated with a stage-occupation message from the user includes: sending to the server another request message for occupying the stage for playing the background music, and upon reception of an indication message indicating that the stage for playing the background music is successfully occupied, updating a status interface of the stage for playing the background music. For example, the client sends to the server a request message for occupying the stage for playing background music. In another example, the server receives the request message, detects if the stage is used, and if the stage is not used, returns to the client an instruction of successful occupation. In yet another example, if the stage is occupied, the server sends to the client an instruction of waiting or failure. As an example, upon receipt of an instruction of successful stage occupation, the client can update the stage interface of the client.

Figure 2:
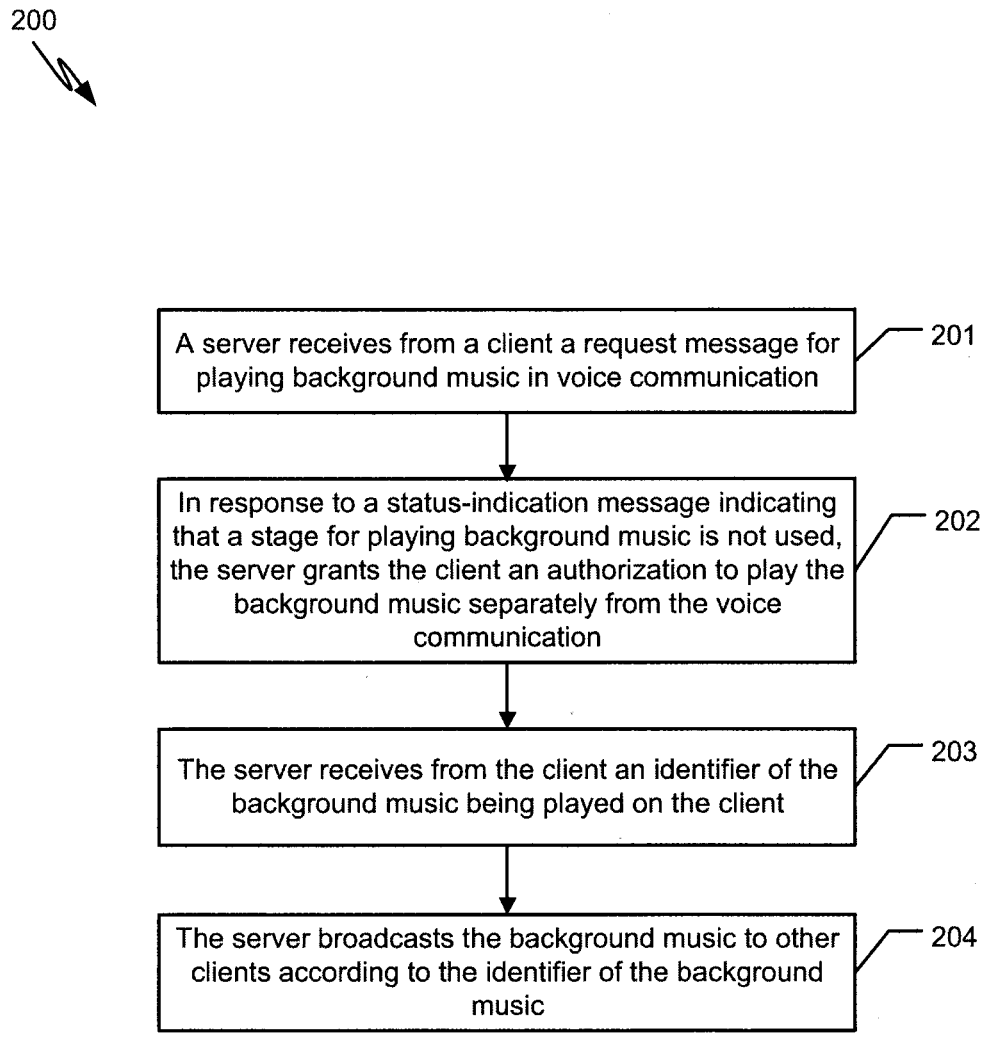
FIG. 2 is a simplified diagram showing a method for data exchange in voice communication according to another embodiment of the present invention.

FIG. 2 is a simplified diagram showing a method for data exchange in voice communication according to another embodiment of the present invention. This diagram is merely an example, which should not unduly limit the scope of the claims. One of ordinary skill in the art would recognize many variations, alternatives, and modifications. The method 200 includes at least the processes 201-204.

According to one embodiment, during the process 201, a server receives from a client a request message for playing background music in voice communication. For example, during the process 202, the server grants the client an authorization to play background music separately from the voice communication when a status-indication message indicates that a stage for playing background music is not used. In another example, after receiving the request from the client and finding that the stage for playing background music is not used, the server may authorize the client that sends the application so that the client has the authorization to play the background music.

According to another embodiment, during the process 203, the server receives from the client an identifier of the background music being played on the client. For example, after the server authorizes the client, the client can play background music. In another example, the client sends the identifier of the background music to the server after the client plays the background music. In yet another example, during the process 204, the server broadcasts the background music being played by the client to other clients according to the identifier of the background music so that all other clients in the chat room can hear the background music.

According to yet another embodiment, the process 201 includes: receiving from the client a status-request message associated with a stage for playing the background music. For example, corresponding, the process 202 includes: sending to the client a status-indication message associated with the stage for playing the background music, receiving from the client another request message for occupying the stage for playing the background music, and sending to the client an indication message indicating the stage is successfully occupied upon detection of the stage for playing the background music being not used. As an example, the server sends to the client the status-indication message for the stage for playing background music after receiving from the client the status-request message for the stage for playing background music. In another example, upon reception of a request message for occupying the stage for playing background music from the client, the server detects the current use status of the stage for playing the background music, and if the stage is not used, sends to the client the indication message of successful occupation so that the client can access the stage and play the background music.

Figure 3:
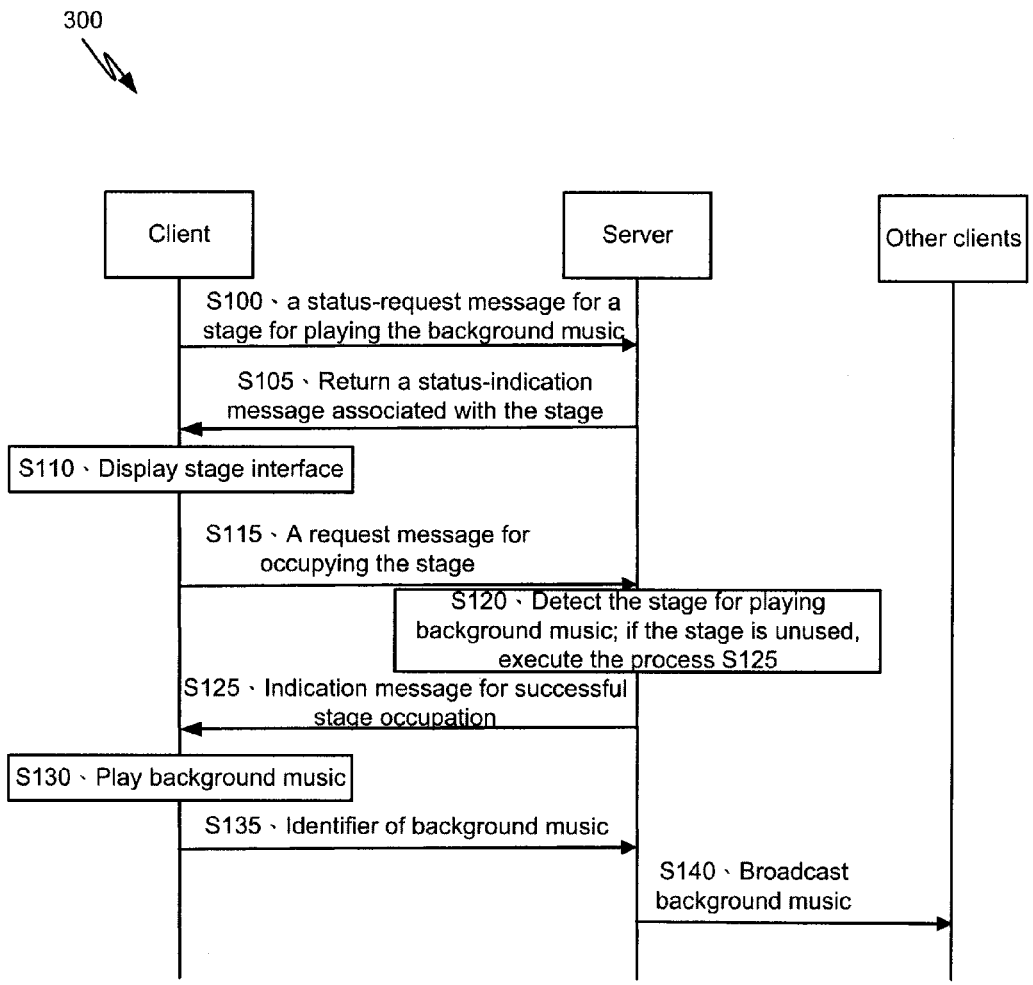
FIG. 3 is a simplified diagram showing a method for data exchange in voice communication according to yet another embodiment of the present invention.

FIG. 3 is a simplified diagram showing a method for data exchange in voice communication according to yet another embodiment of the present invention. This diagram is merely an example, which should not unduly limit the scope of the claims. One of ordinary skill in the art would recognize many variations, alternatives, and modifications. The method 300 includes at least the processes S100-S140.

According to one embodiment, during the process S100, a client sends to a server a status-request message for a stage for playing background music. For example, during the process S105, the server returns a status-indication message for the stage for playing background music. As an example, the indication message of stage state includes forbidden, unused or being used by a specific user. In another example, during the process S110, the client may display the stage interface.

Figure 4:
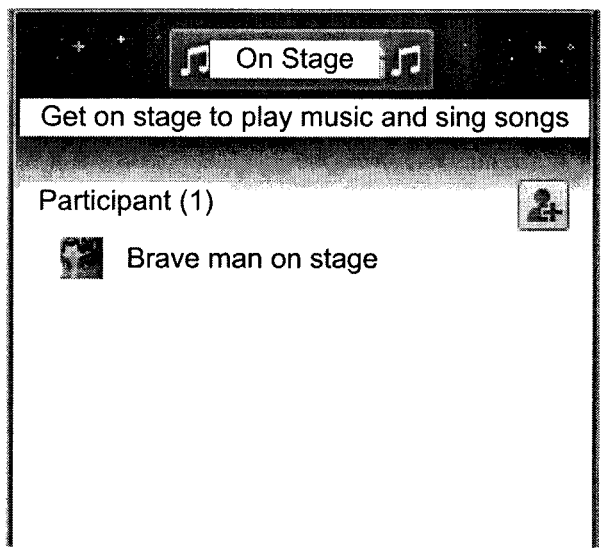
FIG. 4 is a simplified diagram showing a stage interface displayed on a client according to one embodiment of the present invention.

FIG. 4 is a simplified diagram showing a stage interface displayed on a client according to one embodiment of the present invention. This diagram is merely an example, which should not unduly limit the scope of the claims. One of ordinary skill in the art would recognize many variations, alternatives, and modifications. The stage interface 400 instructs users to enter the stage, play music or sing songs to friends in a chat room, in some embodiments.

Referring back to FIG. 3, during the process S115, when the status-indication message indicates that the stage for playing background music is not used, the client sends to the server a request message for occupying the stage for playing background music after the user clicks an instruction message to enter the stage on the interface, in certain embodiments. For example, during the process S120, the server detects the stage for playing background music, and the process S125 is executed if the stage for playing background music is found to be not used. In another example, during the process S125, the server sends to the client an instruction message of successful occupation. In yet another example, upon receipt of the instruction message of successful occupation, the client successfully accesses the stage.

Figure 5:
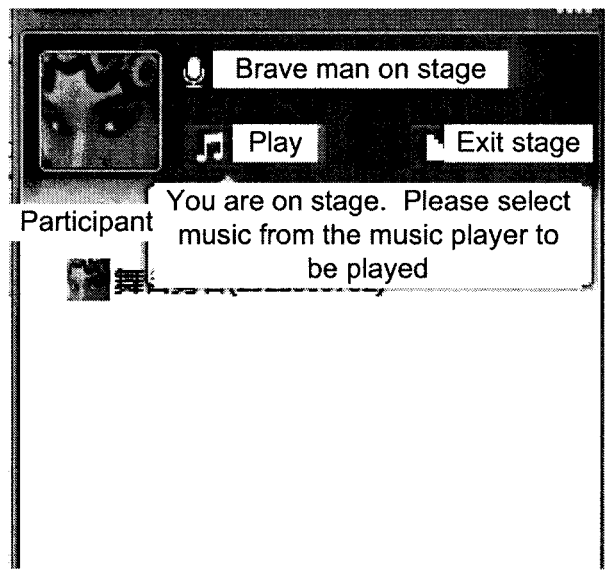
FIG. 5 is a simplified diagram showing the stage interface as shown in FIG. 4 being occupied according to one embodiment of the present invention.

FIG. 5 is a simplified diagram showing the stage interface 400 being occupied according to one embodiment of the present invention. This diagram is merely an example, which should not unduly limit the scope of the claims. One of ordinary skill in the art would recognize many variations, alternatives, and modifications.

The stage interface 400 indicates that a user is on stage and instructs the user to play music to others, in some embodiments. For example, the user may choose to leave the stage to stop playing music. In another example, the off-stage message is transmitted to the server. In yet another example, the stage resumes an unused state and waits for clients to access.

Referring back to FIG. 3, during the process S130, the client starts playing background music. For example, during the process S135, the client sends to the server an identifier of the background music. In another example, during the process S140, the server finds the background music being played according to the identifier of the background music and broadcasts the background music to other clients.

Figure 6:
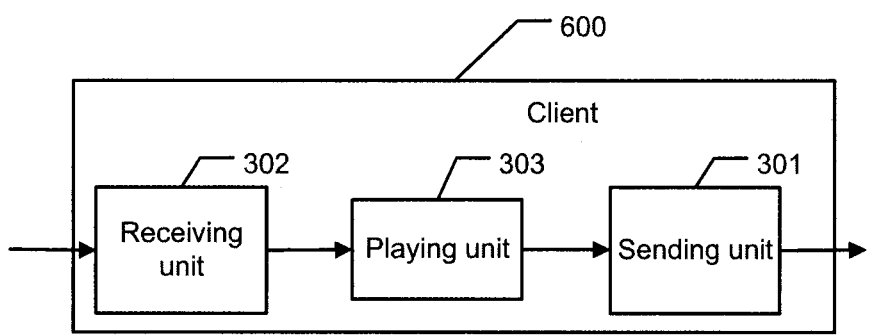
FIG. 6 is a simplified diagram showing a client for data exchange in voice communication according to one embodiment of the present invention.

FIG. 6 is a simplified diagram showing a client for data exchange in voice communication according to one embodiment of the present invention. This diagram is merely an example, which should not unduly limit the scope of the claims. One of ordinary skill in the art would recognize many variations, alternatives, and modifications. The client 600 includes a sending unit 301, a receiving unit 302, and a playing unit 303.

According to one embodiment, the sending unit 301 is configured to send to a server a request message for playing background music in voice communication. For example, the receiving unit 302 is configured to receive an authorization granted by the server to play background music separately from the voice communication and receive a play instruction from a user. In another example, the playing unit 303 is configured to play background music according to the play instruction received by the receiving unit 302. In yet another example, the sending unit 301 is further configured to send to the server an identifier of the background music being played by the playing unit 303 so that the server broadcasts the background music being played to other clients according to the identifier of the background music.

In operation, the sending unit 301 sends to a server a request message for playing background music in voice communication; the receiving unit 302 receives an authorization granted by the server to play background music separately from the voice communication and receives a play instruction from a user; the playing unit 303 plays background music according to the play instruction received by the receiving unit 302; and the sending unit 301 sends to the server an identifier of the background music being played by the playing unit 303 so that the server broadcasts the background music being played to other clients according to the identifier of the background music, in some embodiments.

Figure 7:
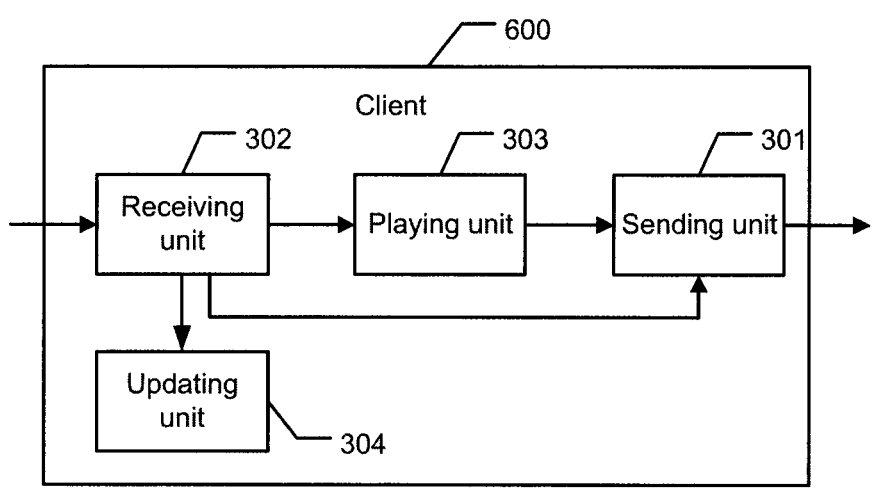
FIG. 7 is a simplified diagram showing a client for data exchange in voice communication according to another embodiment of the present invention.

FIG. 7 is a simplified diagram showing the client 600 according to another embodiment of the present invention. This diagram is merely an example, which should not unduly limit the scope of the claims. One of ordinary skill in the art would recognize many variations, alternatives, and modifications. In addition to the sending unit 301, the receiving unit 302, and the playing unit 303, the client 600 further includes an updating unit 304.

According to one embodiment, the sending unit 301 is configured to send to the server a status-request message for a stage for playing background music. For example, the receiving unit 302 is configured to receive from the server a status-indication message for the stage for playing background music. In another example, the sending unit 301 is configured to send to the server a request message for occupying the stage for playing background music when the status-indication message received by the receiving unit 302 indicates that the stage for playing background music is not used. In yet another example, the receiving unit 302 is configured to receive an indication message indicating that the stage for playing background music is successfully occupied. In yet another example, the updating unit 304 is configured to update a status interface of the stage for playing background music after the receiving unit 302 receives the indication message indicating successful occupation.

Figure 8:
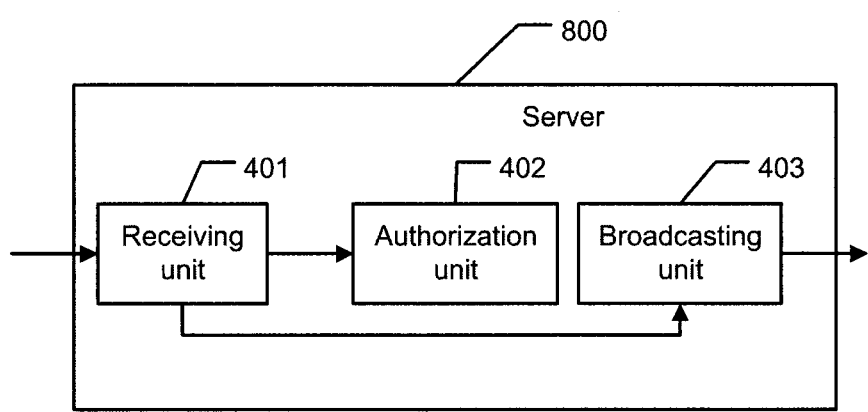
FIG. 8 is a simplified diagram showing a server for data exchange in voice communication according to one embodiment of the present invention.

FIG. 8 is a simplified diagram showing a server for data exchange in voice communication according to one embodiment of the present invention. This diagram is merely an example, which should not unduly limit the scope of the claims. One of ordinary skill in the art would recognize many variations, alternatives, and modifications. The server 800 includes a receiving unit 401, an authorization unit 402, and a broadcasting unit 403.

According to one embodiment, the receiving unit 401 is configured to receive from a client a request message for playing background music in voice communication. For example, the authorization unit 402 is configured to grant the client an authorization to play background music separately from the voice communication when a status-indication message indicates that a stage for playing background music is not used. In another example, the receiving unit 401 is configured to receive from the client an identifier of the background music being played on the client. In yet another example, the broadcasting unit 403 is configured to broadcast the background music being played to other clients according to the identifier of the background music.

In operation, the receiving unit 401 receives from a client a request message for playing background music in voice communication; the authorization unit 402 grants the client an authorization to play background music separately from the voice communication when a status-indication message indicates that a stage for playing background music is not used; the receiving unit 401 receives from the client an identifier of the background music being played on the client; and the broadcasting unit 403 broadcasts the background music being played to other clients according to the identifier of the background music, in some embodiments.

Figure 9:
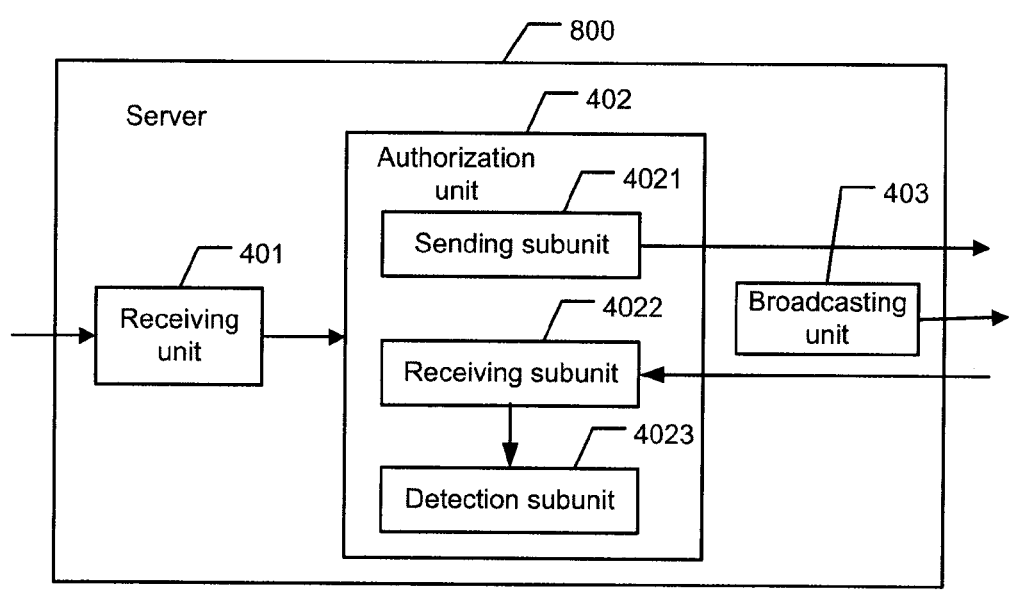
FIG. 9 is a simplified diagram showing a server for data exchange in voice communication according to another embodiment of the present invention.

FIG. 9 is a simplified diagram showing the server 800 according to another embodiment of the present invention. This diagram is merely an example, which should not unduly limit the scope of the claims. One of ordinary skill in the art would recognize many variations, alternatives, and modifications.

According to one embodiment, the receiving unit 401 is configured to receive from the client a status-request message for a stage for playing background music. For example, the authorization unit 402 includes a sending subunit 4021 configured to send to the client a status-indication message for the stage for playing background music, a receiving subunit 4022 configured to receive from the client a request message for occupying the stage for playing background music, and a detection subunit 4023 configured to send to the client an indication message indicating successful occupation when detecting that the stage for playing background music is not used.

Figure 10:
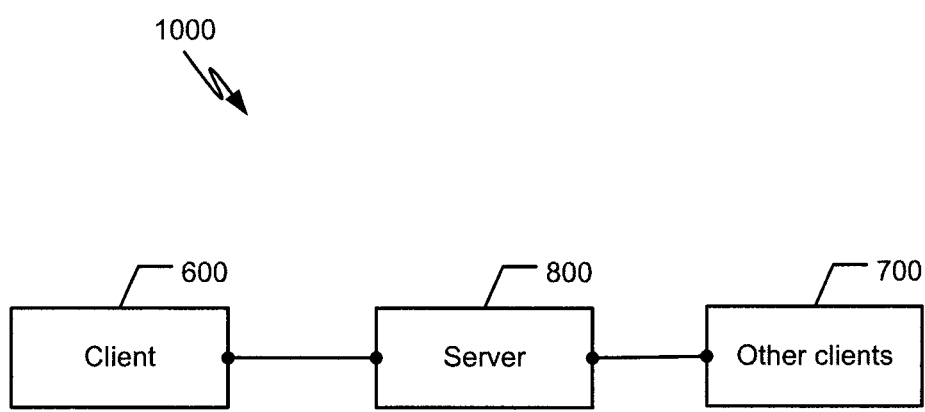
FIG. 10 is a simplified diagram showing a system for data exchange in voice communication according to one embodiment of the present invention.

FIG. 10 is a simplified diagram showing a system for data exchange in voice communication according to one embodiment of the present invention. This diagram is merely an example, which should not unduly limit the scope of the claims. One of ordinary skill in the art would recognize many variations, alternatives, and modifications. The system 1000 includes the client 600, the server 800 and one or more other clients 700.

According to one embodiment, the client 600 is configured to send to the server 800 a request message for playing background music in voice communication, and receive an authorization granted by the server 800 to play background music separately from the voice communication. For example, the client is further configured to, after receiving a play instruction from a user, play the background music and send to the server 800 an identifier of the background music being played so that the server 800 broadcasts the background music being played to other clients 700 according to the identifier of the background music.

According to another embodiment, the server 800 is configured to receive from the client 600 a request message for playing background music in voice communication, and grant the client 600 an authorization to play background music separately from the voice communication when a status-indication message indicates that a stage for playing background music is not used. For example, the server 800 is further configured to receive from the client 600 an identifier of the background music being played on the client 600 and broadcast the background music being played to the other clients 700 according to the identifier of the background music.

Figure 11:
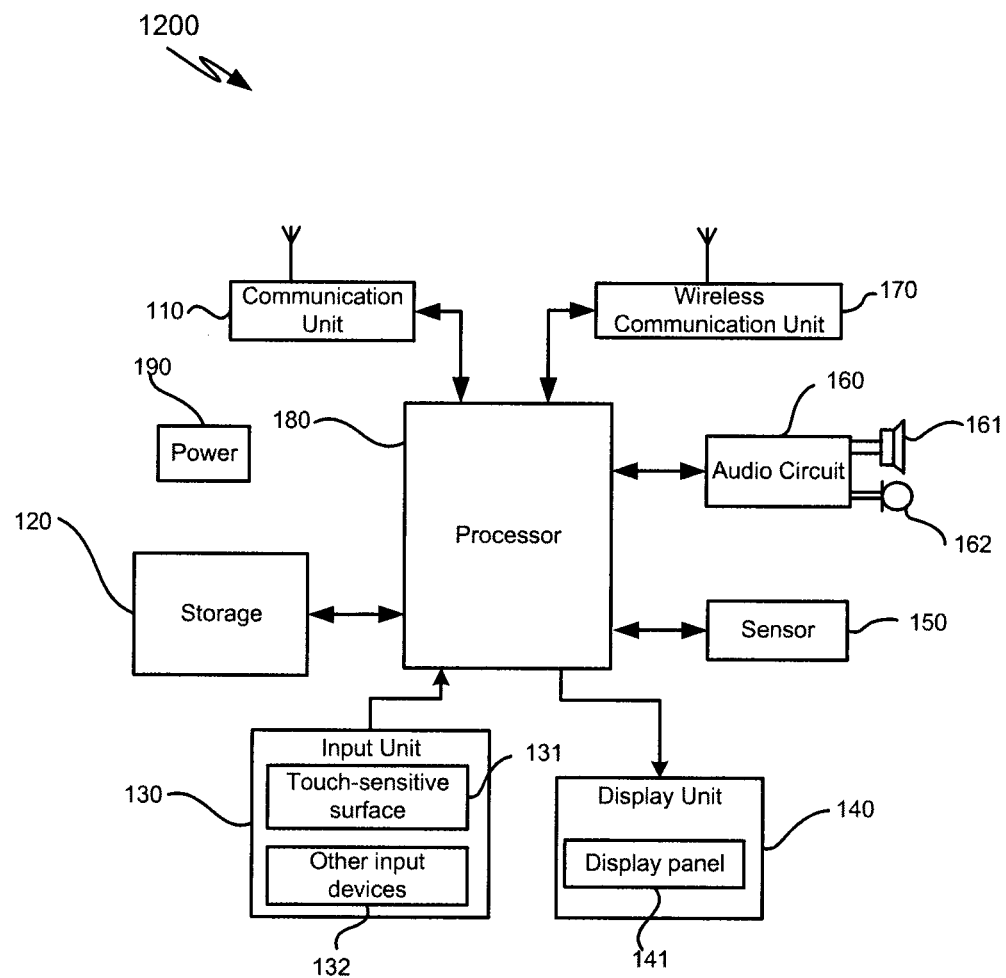
FIG. 11 is a simplified diagram showing a client for data exchange in voice communication according to yet another embodiment of the present invention.

FIG. 11 is a simplified diagram showing a client for data exchange in voice communication according to yet another embodiment of the present invention. This diagram is merely an example, which should not unduly limit the scope of the claims. One of ordinary skill in the art would recognize many variations, alternatives, and modifications.

According to one embodiment, the client 1200 includes a RF (i.e., radio frequency) circuit 110, a memory 120 that includes one or more computer-readable storage medium, an input unit 130, a display unit 140, a sensor 150, an audio circuit 160, a WiFi (i.e., wireless fidelity) module 170, one or more processors 180 that includes one or more processing cores, and a power supply 190. For example, the RF circuit 110 is configured to send/receive messages or signals in communication. As an example, the RF circuit 110 receives a base station's downlink information, delivers to the processors 180 for processing, and sends uplink data to the base station. For example, the RF circuit 110 includes an antenna, at least one amplifier, a tuner, one or several oscillators, SIM (Subscriber Identity Module) card, a transceiver, a coupler, an LNA (Low Noise Amplifier) and a duplexer. In another example, the RF circuit 110 communicates with the network and other equipments via wireless communication based on any communication standard or protocols, such as GSM (Global System of Mobile communication), GPRS (General Packet Radio Service), CDMA (Code Division Multiple Access), WCDMA (Wideband Code Division Multiple Access), LTE (Long Term Evolution), email, SMS (Short Messaging Service), etc.

According to another embodiment, the memory 120 is configured to store software programs and modules. For example, the processors 180 are configured to execute various functional applications and data processing by running the software programs and modules stored in the memory 120. The memory 120 includes a program storage area and a data storage area, where the program storage area may store the operating system, and the application(s) required by one or more functions (e.g., an audio player or a video player), in some embodiments. For example, the data storage area stores the data created based on the use of the client 1200 (e.g., audio data or a phone book). In another example, the memory 120 includes a high-speed random access storage, a non-volatile memory, one or more floppy disc storage devices, a flash storage device or other volatile solid storage devices. As an example, the memory 120 further includes a memory controller to enable access to the memory 120 by the processors 180 and the input unit 130.

According to yet another embodiment, the input unit 130 is configured to receive an input number or character data and generate inputs for a keyboard, a mouse, and a joystick, optical or track signals relating to user setting and functional control. For example, the input unit 130 includes a touch-sensitive surface 131 and other input devices 132. The touch-sensitive surface 131 (e.g., a touch screen or a touch panel) is configured to receive the user's touch operations thereon or nearby (e.g., the user's operations on or near the touch-sensitive surface with a finger, a touch pen or any other appropriate object or attachment) and drive the corresponding connected devices according to the predetermined program. For example, the touch-sensitive surface 131 includes two parts, namely a touch detector and a touch controller. The touch detector detects the position of user touch and the signals arising from such touches and sends the signals to the touch controller. The touch controller receives touch data from the touch detector, converts the touch data into the coordinates of the touch point, sends the coordinates to the processors 180 and receives and executes the commands received from the processors 180. For example, the touch-sensitive surface 131 is of a resistance type, a capacitance type, an infrared type and a surface acoustic wave type. In another example, other than the touch-sensitive surface, the input unit 130 includes the other input devices 132. For example, the other input devices 132 include one or more physical keyboards, one or more functional keys (e.g., volume control keys or switch keys), a track ball, a mouse and/or a joystick.

According to yet another embodiment, the display unit 140 is configured to display data input from a user or provided to the user, and includes various graphical user interfaces of the client 1200. For example, these graphical user interfaces include graphs, texts, icons, videos and a combination thereof. The display unit 140 includes a display panel which contains a LCD (liquid crystal display), an OLED (organic light-emitting diode). As an example, the touch-sensitive surface can cover the display panel. For example, upon detecting any touch operations thereon or nearby, the touch-sensitive surface sends signals to the processors 180 to determine the type of the touch events and then the processors 180 provides corresponding visual outputs on the display panel according to the type of the touch events. Although the touch-sensitive surface and the display panel are two independent parts for input and output respectively, the touch-sensitive surface and the display panel can be integrated for input and output, in some embodiments.

In one embodiment, the client 1200 includes a sensor 150 (e.g., an optical sensor, a motion sensor or other sensors). For example, the sensor 150 includes an environment optical sensor and adjusts the brightness of the display panel according to the environmental luminance. In another example, the sensor 150 includes a proximity sensor and turns off or backlights the display panel when the client 1200 moves close to an ear of a user. In yet another example, the sensor 150 includes a motion sensor (e.g., a gravity acceleration sensor) and detects a magnitude of acceleration in all directions (e.g., three axes). Particularly, the sensor 150 detects a magnitude and a direction of gravity when staying still. In some embodiments, the sensor 150 is used for identifying movements of a cell phone (e.g., a switch of screen direction between horizontal and vertical, related games, and a calibration related to a magnetometer) and features related to vibration identification (e.g., a pedometer or a strike). In certain embodiments, the sensor 150 includes a gyroscope, a barometer, a hygroscope, a thermometer and/or an infrared sensor.

In another embodiment, the audio circuit 160, a speaker, and a microphone are configured to provide an audio interface between a user and the client 1200. For example, the audio circuit 160 is configured to transmit electrical signals converted from certain audio data to the speaker that converts such electrical signals into some output audio signals. In another example, the microphone is configured to convert audio signals into electrical signals which are converted into audio data by the audio circuit 160. The audio data are processed in the processors 180 and received by the RF circuit 110 before being sent to another terminal, in some embodiments. For example, the audio data are output to the memory 120 for further processing. As an example, the audio circuit 160 includes an earphone jack for communication between a peripheral earphone and the client 1200.

WiFi is a short-distance wireless transmission technology. In some embodiments, through the WiFi module 170, the client 1200 enables the user to receive and send emails, browse webpages, and/or access stream media. For example, the client 1200 is configured to provide the user with a wireless broadband Internet access. In some embodiments, the WiFi module 170 is omitted in the client 1200.

According to one embodiment, the processors 180 are the control center of the client 1200. For example, the processors 180 is connected to various parts of the client 1200 (e.g., a cell phone) via various interfaces and circuits, and executes various features of the client 1200 and processes various data through operating or executing the software programs and/or modules stored in the memory 120 and calling the data stored in the memory 120, so as to monitor and control the client 1200 (e.g., a cell phone). As an example, the processors 180 include one or more processing cores. In another example, the processors 180 is integrated with an application processor and a modem processor, where the application processor mainly handles the operating system, the user interface and the applications and the modem processor mainly handles wireless communications. In some embodiments, the modem processor is not integrated into the processors 180.

According to another embodiment, the client 1200 includes the power supply 190 (e.g., a battery) that powers up various parts. For example, the power supply 190 is logically connected to the processors 180 via a power source management system so that the charging, discharging and power consumption can be managed via the power source management system. In another example, the power supply 190 includes one or more DC or AC power sources, a recharging system, a power-failure-detection circuit, a power converter, an inverter, a power source state indicator, or other components. In yet another example, the client 1200 includes a camcorder, a Bluetooth module, etc. Specifically, the processors 180 of the client 1200 load executable files associated with one or more applications to the memory 120 and run the applications stored in the memory 120 according to the method 100, the method 200, and/or the method 300.

According to yet another embodiment, a method provided for data exchange in voice communication. For example, a first request message is sent to a server for playing background music in voice communication; an authorization granted by the server to play background music separately from the voice communication is received; and upon reception of a play instruction from a user, the background music is played and an identifier of the background music is sent to the server. The server broadcasts the background music to one or more clients based on at least information associated with the identifier of the background music. For example, the method is implemented according to at least FIG. 1, and/or FIG. 3.

According to another embodiment, a method is provided for data exchange in voice communication. For example, a first request message for playing background music in voice communication is received from a first client; in response to a status-indication message indicating that a stage for playing background music is not used, the first client is granted an authorization to play the background music separately from the voice communication; an identifier of the background music being played on the first client is received from the client; and the background music is broadcasted to one or more second clients based on at least information associated with the identifier of the background music. For example, the method is implemented according to at least FIG. 2, and/or FIG. 3.

According to yet another embodiment, a client includes: a sending unit configured to send to a server a first request message for playing background music in voice communication, a receiving unit configured to receive an authorization granted by the server to play the background music separately from the voice communication and receive a play instruction from a user, and a playing unit configured to play the background music based on at least information associated with the play instruction received by the receiving unit. The sending unit is further configured to send to the server an identifier of the background music being played by the playing unit so that the server broadcasts the background music to one or more other clients based on at least information associated with the identifier of the background music. For example, the client is implemented according to at least FIG. 6, and/or FIG. 7.

According to yet another embodiment, a server includes: a receiving unit configured to receive from a first client a first request message for playing background music in voice communication, and an authorization unit configured to, in response to a status-indication message indicating that a stage for playing background music is not used, grant the first client an authorization to play the background music separately from the voice communication, where the receiving unit is further configured to receive from the first client an identifier of the background music being played on the first client. The server further includes a broadcasting unit configured to broadcast the background music to one or more second clients based on at least information associated with the identifier of the background music received by the receiving unit. For example, the server is implemented according to at least FIG. 8, and/or FIG. 9.

In one embodiment, a system for data exchange in voice communication includes a first client and a server. The first client includes: a first sending unit configured to send to the server a first request message for playing background music in voice communication, a first receiving unit configured to receive an authorization granted by the server to play the background music separately from the voice communication and receive a play instruction from a user, and a playing unit configured to play the background music based on at least information associated with the play instruction received by the first receiving unit. The first sending unit is further configured to send to the server an identifier of the background music being played by the playing unit. The server includes: a second receiving unit configured to receive from the first client the first request message for playing the background music in the voice communication, and an authorization unit configured to, in response to a status-indication message indicating that a stage for playing the background music is not used, grant the first client the authorization to play the background music separately from the voice communication, where the second receiving unit is further configured to receive from the first client the identifier of the background music being played on the first client. The server further includes a broadcasting unit configured to broadcast the background music to one or more second clients based on at least information associated with the identifier of the background music received by the second receiving unit. For example, the system is implemented according to at least FIG. 10.

In another embodiment, a non-transitory computer readable storage medium includes programming instructions for data exchange in voice communication. The programming instructions are configured to cause one or more data processors to execute certain operations. For example, a first request message is sent to a server for playing background music in voice communication; an authorization granted by the server to play background music separately from the voice communication is received; and upon reception of a play instruction from a user, the background music is played and an identifier of the background music is sent to the server. The server broadcasts the background music to one or more clients based on at least information associated with the identifier of the background music. For example, the storage medium is implemented according to at least FIG. 1, and/or FIG. 3.

In yet another embodiment, a non-transitory computer readable storage medium includes programming instructions for data exchange in voice communication. The programming instructions are configured to cause one or more data processors to execute certain operations. For example, a first request message for playing background music in voice communication is received from a first client; in response to a status-indication message indicating that a stage for playing background music is not used, the first client is granted an authorization to play the background music separately from the voice communication; an identifier of the background music being played on the first client is received from the client; and the background music is broadcasted to one or more second clients based on at least information associated with the identifier of the background music. For example, the storage medium is implemented according to at least FIG. 2, and/or FIG. 3.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for playing background music in a multi-client voice communication, the method comprising:

sending by a client to a server a first request message requesting authorization from the server for playing background music in a voice communication between the client and one or more other clients, wherein the voice communication is transmitted through a first channel;

receiving by the client an authorization granted by the server to play background music;

receiving by the client a play instruction from a user; and responsive to receiving the authorization and the play instruction, sending by the client to the server an identifier of a first background music;

wherein the identifier of the first background music is configured to cause the server to transmit the first background music associated with the identifier to the one or more other clients in communication with the client;

wherein the first background music is transmitted through a second channel different from the first channel through which the voice communication is transmitted.

2. The method of claim 1, wherein:

the first request message includes a status-request message associated with a stage for playing background music; and the authorization includes a status-indication message associated with the stage for playing background music; and the method further includes:

in response to receiving the status-indication message, occupying by the client the stage for playing background music based on at least information associated with a stage-occupation message from the user.

3. The method of claim 2, wherein the occupying the stage for playing background music based on at least information associated with the stage-occupation message from the user includes:

sending by the client to the server a second request message for occupying the stage for playing background music; and responsive to reception by the client of an indication message indicating that the stage for playing background music is successfully occupied, updating a status interface of the stage for playing background music.

4. A method for playing background music in a multi-client voice communication, the method comprising:

receiving by a server from a first client a first request message requesting authorization from the server for playing background music in a voice communication between the first client and one or more other clients, wherein the voice communication is transmitted through a first channel;

responsive to receiving the first request message, detecting by the server whether a stage for playing background music is not used;

responsive to detecting that the stage for playing background is not used, granting by the server an authorization for the first client to play background music;

subsequent to granting the authorization, receiving by the server from the first client an identifier of a first background music; and transmitting, by the server, the first background music associated with the identifier to the one or more other clients in communication with the first client;

wherein the first background music is transmitted through a second channel different from the first channel through which the voice communication is transmitted.

5. The method of claim 4, wherein:

the first request message includes a status-request message associated with the stage for playing background music; and the granting the first client the authorization to play background music includes:

sending to the first client a status-indication message associated with the stage for playing background music;

receiving from the first client a second request message for occupying the stage for playing background music; and sending to the first client an indication message indicating the stage is successfully occupied upon detection of the stage for playing background music being not used.

6. A client comprising:

a sending unit configured to send to a server a first request message requesting authorization from the server for playing background music in a voice communication between the first client and one or more other clients, wherein the voice communication is transmitted through a first channel;

a receiving unit configured to receive an authorization granted by the server to play background music and to receive a play instruction from a user; and a playing unit configured to play background music, responsive to receiving by the receiving unit the authorization and the play instruction, based on at least information associated with the play instruction received by the receiving unit;

wherein the sending unit is further configured to send to the server, responsive to receiving by the receiving unit the authorization and the play instruction, an identifier of a first background music;

wherein the identifier of the first background music is configured to cause the server to transmit the first background music associated with the identifier to the one or more other clients in communication with the client;

wherein the first background music is transmitted through a second channel different from the first channel through which the voice communication is transmitted.

7. The client of claim 6, wherein:

the first request message includes a status-request message associated with a stage for playing background music;

the receiving unit is further configured to receive from the server a status-indication message associated with the stage for playing background music;

the sending unit is further configured to, in response to the status-indication message indicating that the stage for playing background music is not used, send to the server a second request message for occupying the stage for playing background music;

the receiving unit is configured to receive an indication message indicating that the stage for playing background music is successfully occupied; and the client further includes an updating unit configured to update a status interface of the stage for playing background music after the receiving unit receives the indication message indicating that the stage for playing background music is successfully occupied.

8. The client of claim 6, further comprising:

one or more data processors; and a computer-readable storage medium;

wherein one or more of the receiving unit, the playing unit, and the sending unit are stored in the storage medium and configured to be executed by the one or more data processors.

9. A server comprising:

a receiving unit configured to receive from a first client a first request message requesting authorization from the server for playing background music in a voice communication between the first client and one or more other clients, wherein the voice communication is transmitted through a first channel;
an authorization unit configured to, in response to receiving the first request message:
  (a) determine whether a stage for playing background music is not used;
  (b) based upon the stage for playing background music not being used, send to the first client a status-indication message indicating that the stage for playing background music is not used; and
  (c) grant the first client an authorization to play background music;
wherein the receiving unit is further configured to receive from the first client, subsequent to granting the first client the authorization, an identifier of a first background music; and
a transmitting unit configured to the transmit the first background music associated with the identifier to the one or more other clients in communication with the first client;
wherein the first background music is transmitted through a second channel different from the first channel through which the voice communication is transmitted.

10. The server of claim 9, wherein:
the first request message includes a status-request message associated with the stage for playing background music; and
the authorization unit includes:
  a sending subunit configured to send to the first client the status-indication message associated with the stage for playing background music;
  a receiving subunit configured to receive from the first client a second request message for occupying the stage for playing background music; and
  a detection subunit configured to send to the first client an indication message indicating the stage is successfully occupied upon detection of the stage for playing background music being not used.

11. The server of claim 9, further comprising:
one or more data processors; and
a computer-readable storage medium;
wherein one or more of the receiving unit, the authorization unit, and the transmitting unit are stored in the storage medium and configured to be executed by the one or more data processors.

12. A system for playing background music in a multi-client voice communication, the system comprising:
a first client; and
a server;
wherein the first client includes:
  a first sending unit configured to send to the server a first request message requesting authorization from the server for playing background music in a voice communication between the first client and one or more other clients, wherein the voice communication is transmitted through a first channel;
  a first receiving unit configured to receive an authorization granted by the server to play background music and receive a play instruction from a user; and
  a playing unit configured to play background music, responsive to receiving the authorization and the play instruction, based on at least information associated with the play instruction received by the first receiving unit;
  wherein the first sending unit is further configured to send to the server, responsive to receiving the authorization and the play instruction, an identifier of a first background music; and
wherein the server includes:
  a second receiving unit configured to receive from the first client the first request message requesting authorization from the server for playing background music in the voice communication;
  an authorization unit configured to, in response to the first request message, grant the first client the authorization to play background music;
  wherein the second receiving unit is further configured to receive from the first client, subsequent to granting the authorization, the identifier of the first background music; and
  a transmitting unit configured to transmit the first background music associated with the identifier to the one or more other clients in communication with the first client;
  wherein the first background music is transmitted through a second channel different from the first channel through which the voice communication is transmitted.

13. The system of claim 12, wherein:
the first request message includes a status-request message associated with a stage for playing background music;
the first receiving unit is further configured to receive from the server a status-indication message associated with the stage for playing background music;
the first sending unit is further configured to, in response to the status-indication message indicating that the stage for playing background music is not used, send to the server a second request message for occupying the stage for playing background music;
the first receiving unit is configured to receive an indication message indicating that the stage for playing background music is successfully occupied; and
the first client further includes an updating unit configured to update a status interface of the stage for playing background music after the first receiving unit receives the indication message indicating that the stage for playing background music is successfully occupied.

14. The system of claim 12, wherein:
the authorization unit includes:
  a sending subunit configured to send to the first client the status-indication message associated with the stage for playing background music;
  a receiving subunit configured to receive from the first client the second request message for occupying the stage for playing background music; and
  a detection subunit configured to send to the first client the indication message indicating the stage is successfully occupied upon detection of the stage for playing background music being not used.

15. The system of claim 12, further comprising:
one or more data processors; and
a computer-readable storage medium;
wherein one or more of the first receiving unit, the playing unit, the first sending unit, the second receiving unit, the authorization unit, and the transmitting unit are stored in the storage medium and configured to be executed by the one or more data processors.

16. A non-transitory computer readable storage medium comprising programming instructions for playing background music in a multi-client voice communication, the programming instructions configured to cause one or more data processors to execute operations comprising:

sending to a server a first request message requesting authorization from the server for playing background music in a voice communication between the client and one or more other clients, wherein the voice communication is transmitted through a first channel;

receiving an authorization granted by the server to play background music;

receiving a play instruction from a user;

responsive to receiving the authorization and the play instruction, sending to the server an identifier of a first background music;

wherein the identifier of the first background music is configured to cause the server to transmit the first background music associated with the identifier to the one or more other clients in communication with the client;

wherein the first background music is transmitted through a second channel different from the first channel through which the voice communication is transmitted.

17. A non-transitory computer readable storage medium comprising programming instructions for playing background music in a multi-client voice communication, the programming instructions configured to cause one or more data processors to execute operations comprising:

receiving by a server from a first client a first request message requesting authorization from the server for playing background music in a voice communication between the first client and one or more other clients, wherein the voice communication is transmitted through a first channel;

responsive to receiving the first request message, detecting whether a stage for playing background music is not used;

responsive to detecting that the stage for playing background is not used, granting an authorization for the first client to play background music;

subsequent to granting the authorization, receiving from the client an identifier of a first background music; and transmitting the first background music associated with the identifier to the one or more other clients in communication with the first client;

wherein the first background music is transmitted through a second channel different from the first channel through which the voice communication is transmitted.

\* \* \* \* \*